United States Patent
He et al.

(10) Patent No.: US 12,549,279 B2
(45) Date of Patent: Feb. 10, 2026

(54) METHOD FOR ADJUSTING TRANSMISSION RATE, PROCESSOR, NETWORK DEVICE, AND NETWORK SYSTEM

(71) Applicant: Huawei Technologies Co., Ltd., Shenzhen (CN)

(72) Inventors: Xiang He, Beijing (CN); Xinyuan Wang, Beijing (CN); Weijun Le, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 748 days.

(21) Appl. No.: 17/584,911

(22) Filed: Jan. 26, 2022

(65) Prior Publication Data

US 2022/0149988 A1 May 12, 2022

Related U.S. Application Data

(63) Continuation of application No. PCT/CN2020/099226, filed on Jun. 30, 2020.

(30) Foreign Application Priority Data

Jul. 27, 2019 (CN) .......................... 201910685561.2
Aug. 8, 2019 (CN) .......................... 201910731452.X

(51) Int. Cl.
    *H04L 1/00* (2006.01)
    *H04L 25/02* (2006.01)

(52) U.S. Cl.
    CPC ............ *H04L 1/004* (2013.01); *H04L 1/0067* (2013.01); *H04L 25/0262* (2013.01)

(58) Field of Classification Search
    CPC . H04L 1/0067; H04L 25/0262; H04L 41/083; H04L 1/004; H04J 2203/0085; H04J 3/1658; H04J 3/07
    See application file for complete search history.

(56) References Cited

U.S. PATENT DOCUMENTS 5,099,496 A * 3/1992 Pope .................. H04L 25/03044
                                                    338/18
5,646,606 A * 7/1997 Wilson .................. H04W 76/50
                                                    340/6.1

(Continued)

FOREIGN PATENT DOCUMENTS

CN           1816969 A        8/2006
CN         101193060 A  *     6/2008

(Continued)

OTHER PUBLICATIONS

Dai et al., "Method For Realising Reliable E1 Transmission Using Forward Error Correction Mechanism On Packet Network", Jun. 4, 2008, CN, English translation of CN 200610163606 (citations are from English translation) (Year: 2008).*

(Continued)

*Primary Examiner* — Michael K Phillips
(74) *Attorney, Agent, or Firm* — Conley Rose, P.C.

(57) ABSTRACT

A method includes obtaining first data at a first rate, wherein the first data is encoded using a first forward error correction (FEC) code type, encoding the first data according to a second FEC code type to obtain second data, adding an amount of additional data in a specific proportion to the second data to obtain third data, wherein the amount of additional data is based on a ratio of a second rate of sending the third data to the first rate of obtaining the first data, and wherein the second rate is greater than the first rate, and sending the third data at the second rate.

28 Claims, 9 Drawing Sheets

(56) References Cited

U.S. PATENT DOCUMENTS

| | | | |
|---|---|---|---|
| 9,787,431 B2 | 10/2017 | Calderon et al. | |
| 9,912,442 B2 | 3/2018 | Ganga et al. | |
| 2002/0053062 A1* | 5/2002 | Szymanski | H03M 13/6575 |
| | | | 714/801 |
| 2002/0129313 A1* | 9/2002 | Kubo | H03M 13/6561 |
| | | | 714/752 |
| 2006/0150055 A1* | 7/2006 | Quinard | H04L 1/0026 |
| | | | 714/752 |
| 2007/0067695 A1 | 3/2007 | Griesser et al. | |
| 2008/0291824 A1* | 11/2008 | Kendall | G06F 13/4045 |
| | | | 370/230 |
| 2010/0070822 A1* | 3/2010 | Leung | H04L 1/0072 |
| | | | 714/752 |
| 2010/0229067 A1 | 9/2010 | Ganga et al. | |
| 2011/0320905 A1* | 12/2011 | Lin | H04L 1/0067 |
| | | | 714/752 |
| 2012/0179949 A1* | 7/2012 | Wang | H03M 13/1515 |
| | | | 370/476 |
| 2014/0189459 A1 | 7/2014 | Vijayaraghavan et al. | |
| 2015/0071311 A1 | 3/2015 | Caggioni et al. | |
| 2016/0070615 A1 | 3/2016 | Zhong | |
| 2016/0087753 A1 | 3/2016 | Ran et al. | |
| 2018/0041332 A1* | 2/2018 | Yang | H04L 7/048 |
| 2018/0205493 A1* | 7/2018 | Yang | H04L 1/0041 |
| 2020/0067692 A1 | 2/2020 | Yang et al. | |

FOREIGN PATENT DOCUMENTS

| | | |
|---|---|---|
| CN | 101247200 A | 8/2008 |
| CN | 101578795 A | 11/2009 |
| CN | 103534971 A | 1/2014 |
| CN | 102075296 B | 8/2014 |
| CN | 106464427 B | 4/2020 |
| EP | 1152541 A1 | 11/2001 |
| EP | 2405660 A1 | 1/2012 |
| EP | 2701334 A1 | 2/2014 |

OTHER PUBLICATIONS

Zhang, "The Implementation of a Reed Solomon Code Encoder/Decoder", May 2014, California State University, Northridge (Year: 2014).*

* cited by examiner

METHOD FOR ADJUSTING TRANSMISSION RATE, PROCESSOR, NETWORK DEVICE, AND NETWORK SYSTEM

CROSS-REFERENCE TO RELATED APPLICATIONS

This is a continuation of International Patent Application No. PCT/CN2020/099226 filed on Jun. 30, 2020, which claims priority to Chinese Patent Application No. 201910685561.2 filed on Jul. 27, 2019 and Chinese Patent Application No. 201910731452.X filed on Aug. 8, 2019. The disclosures of the aforementioned applications are hereby incorporated by reference in their entireties.

TECHNICAL FIELD

This application relates to the field of communications technologies, and in particular, to a method and an apparatus for adjusting a transmission rate, a processor, a network device, and a system.

BACKGROUND

Due to relatively high costs of a communications device, a smooth evolution manner is usually used during device capacity expansion and upgrade, that is, a module, a line card, or the like is first upgraded to obtain higher performance and an updated feature. Therefore, a backplane becomes one of the biggest bottlenecks that restrict upgrade of the communications device. Performance of the backplane often determines an upgrade prospect of the communications device and a life cycle of the device. However, the backplane, as hardware, is sometimes difficult to meet a future performance requirement.

SUMMARY

Embodiments of this application provide a method and an apparatus for adjusting a transmission rate, a processor, a network device, and a system.

According to an aspect, a method for adjusting a transmission rate is provided. The method includes obtaining first data at a first rate, adding additional data to the first data in a specific proportion to obtain second data, and sending the second data at a second rate, where the second rate is greater than the first rate. A transmission rate is increased by adding the additional data to the first data in the specific proportion, to break a limitation of a backplane on device capacity expansion and upgrade during device capacity expansion and upgrade. This can not only avoid a frequency hole, but also can meet a future performance requirement.

In an example embodiment, the second rate is not an integer multiple of the first rate.

In an example embodiment, sending the second data at the second rate includes sending the second data at the second rate by using a physical lane, where a rate at which data is transmitted by using the physical lane is determined by performing bit multiplexing based on an extended virtual lane, and a quantity of extended virtual lanes is determined based on a quantity of virtual lanes for transmitting the first data and a quantity of corresponding physical lanes when data is transmitted at the second rate by using a data transmission interface. When the second rate is not an integer multiple of the first rate, a quantity of virtual lanes is adjusted to support a quantity of physical lanes at the second rate.

In an example embodiment, the additional data is located in a first part of the second data. In this manner, the additional data may be added to the first data as a whole. For example, the first part of the second data may be located before or after an alignment marker (AM) character.

In an example embodiment, a first part of the additional data is located in a first part of the second data, a second part of the additional data is located in a second part of the second data, and a part of the first data is included between the first part of the additional data and the second part of the additional data. In this manner, the additional data is segmented and added to the first data. For example, the first data may be divided into a plurality of parts, and different parts of the additional data are segmented and added to different parts of the first data.

In an example embodiment, the first data includes an AM character, and adding additional data to the first data in a specific proportion includes inserting the additional data into the first data in the specific proportion by using the AM character in the first data as a boundary. Because the AM character provides an existing mark for data identification, the additional data may be inserted by using the AM character as a reference point, thereby facilitating subsequent identification of the inserted data.

In an example embodiment, adding additional data to the first data in a specific proportion to obtain second data includes, when the first data is data at a media access control (MAC) layer, inserting, in a first proportion, first additional data into the data at the MAC layer, to obtain the second data, when the first data is data transmitted on a virtual lane (VL) distributed by a forward error correction (FEC) sublayer, inserting, in a second proportion, second additional data into the data transmitted on the VL distributed by the FEC sublayer, to obtain the second data, when the first data is data on which VL remapping is performed and that does not enter a physical link, inserting, in a third proportion, third additional data into the data on which VL remapping is performed and that does not enter the physical link, to obtain the second data, when the first data is data transmitted on a physical link, inserting, in a fourth proportion, fourth additional data into the data transmitted on the physical link, to obtain the second data, or when the first data is original data, inserting, in a fifth proportion, fifth additional data into the original data, to obtain the second data. One physical link may have a plurality of physical lanes, and the additional data is inserted at a plurality of locations. This manner is flexible.

In an example embodiment, the adding additional data to the first data in a specific proportion to obtain second data includes encoding the first data based on the second rate by using an FEC code, to obtain the second data. After a rate is increased, compared with indicators that exist during backplane design, an insertion loss caused by backplane cabling and a connector increases, and a crosstalk between signals also increases, severely reducing a signal-to-noise ratio (SNR). To avoid the frequency hole, a link speed needs to be increased, which also brings some available overheads. Therefore, the overheads may be used to compensate for an SNR loss by adding an additional FEC.

In an example embodiment, the encoding the first data based on the second rate by using an FEC code, to obtain the second data includes, when the first data is data that is transmitted on a VL distributed by an FEC sublayer and that is encoded by using a first FEC code, performing, by using a second FEC code matching a rate ratio, secondary encoding on the data that is transmitted on the VL distributed by the FEC sublayer and that is encoded by using the first FEC code, to obtain the second data, where the rate ratio is a ratio of the second rate to the first rate, when the first data is data on which VL remapping is performed, that does not enter a physical link, and that is encoded by using a first FEC code, performing, by using a second FEC code matching a rate ratio, secondary encoding on the data on which VL remapping is performed, that does not enter the physical link, and that is encoded by using the first FEC code, to obtain the second data, when the first data is data transmitted on a physical link and encoded by using a first FEC code, performing, by using a second FEC code matching a rate ratio, secondary encoding on the data transmitted on the physical link and encoded by using the first FEC code, to obtain the second data, when the first data is data encoded by using a first FEC code, decoding the data encoded by using the first FEC code, to obtain original data, and encoding the original data by using a third FEC code matching the second rate, to obtain the second data, where overheads of the third FEC code are greater than overheads of the first FEC code, or when the first data is original data, encoding the original data by using a third FEC code matching the second rate, to obtain the second data, where overheads of the third FEC code are greater than overheads of a first FEC code.

According to an aspect, an apparatus for adjusting a transmission rate is provided. The apparatus includes an obtaining module configured to obtain first data at a first rate, a processing module configured to add additional data to the first data in a specific proportion to obtain second data, and a sending module configured to send the second data at a second rate, where the second rate is greater than the first rate.

In an example embodiment, the second rate is not an integer multiple of the first rate.

In an example embodiment, the sending module is configured to send the second data at the second rate by using a physical lane, where a rate at which data is transmitted by using the physical lane is determined by performing bit multiplexing based on an extended virtual lane, and a quantity of extended virtual lanes is determined based on a quantity of virtual lanes for transmitting the first data and a quantity of corresponding physical lanes when data is transmitted at the second rate by using a data transmission interface.

In an example embodiment, the additional data is located in a first part of the second data.

In an example embodiment, a first part of the additional data is located in a first part of the second data, a second part of the additional data is located in a second part of the second data, and a part of the first data is included between the first part of the additional data and the second part of the additional data.

In an example embodiment, the first data includes an AM character, and the processing module is configured to insert the additional data into the first data in the specific proportion by using the AM character in the first data as a boundary.

In an example embodiment, the processing module is configured to, when the first data is data at a MAC layer, insert, in a first proportion, first additional data into the data at the MAC layer, to obtain the second data, when the first data is data transmitted on a VL distributed by an FEC sublayer, insert, in a second proportion, second additional data into the data transmitted on the VL distributed by the FEC sublayer, to obtain the second data, when the first data is data on which VL remapping is performed and that does not enter a physical link, insert, in a third proportion, third additional data into the data on which VL remapping is performed and that does not enter the physical link, to obtain the second data, when the first data is data transmitted on a physical link, insert, in a fourth proportion, fourth additional data into the data transmitted on the physical link, to obtain the second data, or when the first data is original data, insert, in a fifth proportion, fifth additional data into the original data, to obtain the second data.

In an example embodiment, the processing module is configured to encode the first data based on the second rate by using an FEC code, to obtain the second data.

In an example embodiment, the processing module is configured to, when the first data is data that is transmitted on a VL distributed by an FEC sublayer and that is encoded by using a first FEC code, perform, by using a second FEC code matching a rate ratio, secondary encoding on the data that is transmitted on the VL distributed by the FEC sublayer and that is encoded by using the first FEC code, to obtain the second data, where the rate ratio is a ratio of the second rate to the first rate, when the first data is data on which VL remapping is performed, that does not enter a physical link, and that is encoded by using a first FEC code, perform, by using a second FEC code matching a rate ratio, secondary encoding on the data on which VL remapping is performed, that does not enter the physical link, and that is encoded by using the first FEC code, to obtain the second data, when the first data is data transmitted on a physical link and encoded by using a first FEC code, perform, by using a second FEC code matching a rate ratio, secondary encoding on the data transmitted on the physical link and encoded by using the first FEC code, to obtain the second data, when the first data is data encoded by using a first FEC code, decode the data encoded by using the first FEC code, to obtain original data, and encode the original data by using a third FEC code matching the second rate, to obtain the second data, where overheads of the third FEC code are greater than overheads of the first FEC code, or when the first data is original data, encode the original data by using a third FEC code matching the second rate, to obtain the second data, where overheads of the third FEC code are greater than overheads of a first FEC code.

A processor is further provided. The processor may be configured to perform any one of the foregoing methods.

A network device is further provided. The network device includes the foregoing processor.

In an example embodiment, the network device includes a line card, and the line card includes the foregoing processor.

In an example embodiment, the network device further includes a backplane.

In an example embodiment, the network device further includes a clock and data recovery (CDR) circuit located between the line card and the backplane, and the line card communicates with the backplane by using the CDR circuit.

A network system is further provided. The network system includes one or more network devices, and the network device is any one of the foregoing network devices.

A device for adjusting a transmission rate is further provided. The device includes a memory and a processor. The memory stores at least one instruction or program, and the at least one instruction or program is loaded and executed by the processor, to implement any one of the foregoing methods for adjusting a transmission rate.

A computer-readable storage medium is further provided. The storage medium stores at least one instruction or program, and the instruction or program is loaded and executed by a processor, to implement any one of the foregoing methods for adjusting a transmission rate.

Another communications apparatus is provided. The apparatus includes a transceiver, a memory, and a processor. The transceiver, the memory, and the processor communicate with each other through an internal connection channel. The memory is configured to store instructions or programs. The processor is configured to perform the instructions or programs stored in the memory, to control the transceiver to receive and send a signal. In addition, when the processor executes the instructions or programs stored in the memory, the processor is enabled to perform the method in any one of the foregoing possible implementations. In an embodiment, the processor, the memory, and the transceiver may communicate with each other by using a bus.

In an example embodiment, there are one or more processors, and there are one or more memories.

In an example embodiment, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

A computer program (product) is provided. The computer program (product) includes computer program code. When the computer program code is run on a computer, the computer is enabled to perform the methods in the foregoing aspects.

A chip is provided. The chip includes a processor configured to invoke and run instructions or programs stored in a memory, to enable a communications device on which the chip is installed to perform the methods in the foregoing aspects.

Another chip is provided, including an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

DESCRIPTION OF EMBODIMENTS

To enable a person skilled in the art to better understand solutions of this application, the following describes embodiments of this application in more detail with reference to the accompanying drawings and implementations.

Figure 1:
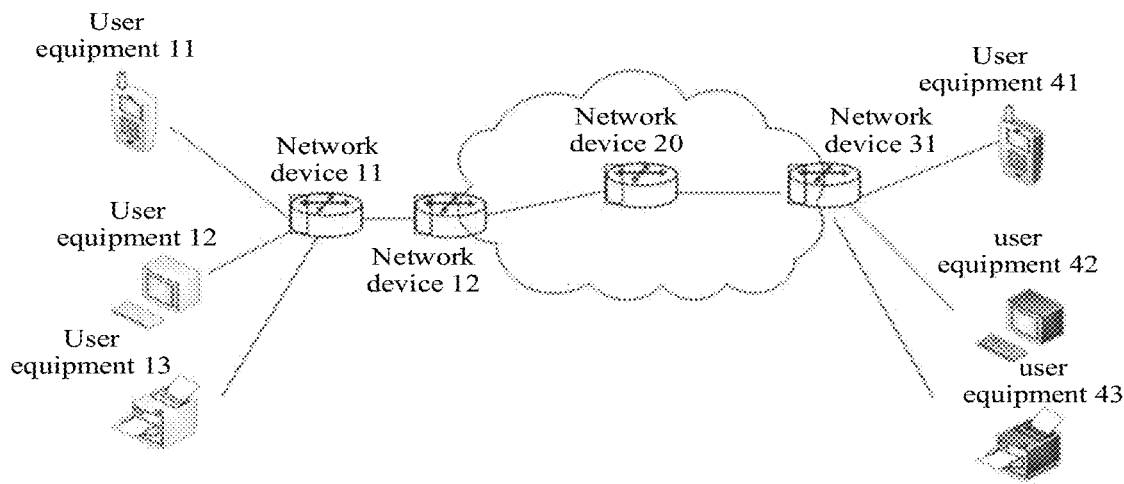
FIG. 1 is a schematic diagram of a network system according to an embodiment of this application.

FIG. 1 shows a network scenario according to an embodiment of this application. In the scenario, one or more user equipments 11, 12, 13, and the like access a network by using a plurality of network devices 11 and 12, where data arrives at a remote network device 31 by using one or more intermediate network devices 20 in the network, and finally communicate with one or more remote user equipments 41, 42, and 43 by using the network device 31. The network in FIG. 1 may be a local area network or a carrier network, and the network device in FIG. 1, for example, a routing device or a switching device, may be used as a forwarding device or a gateway device in the network. The network device may be a communications device or another electronic device.

Figure 2:
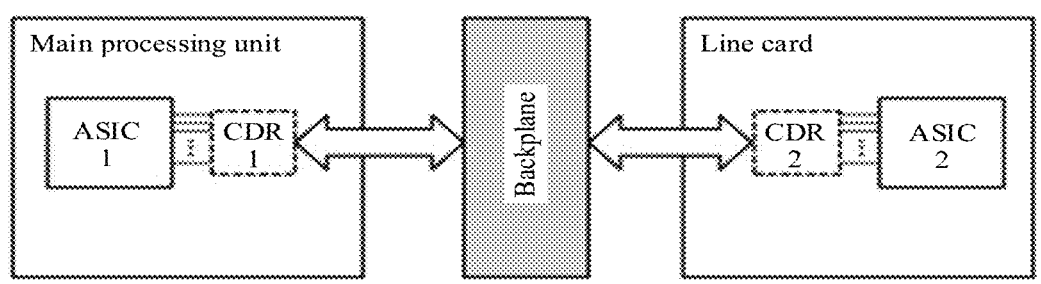
FIG. 2 is a schematic diagram of a structure of a network device according to an embodiment of this application.
Figure 3:
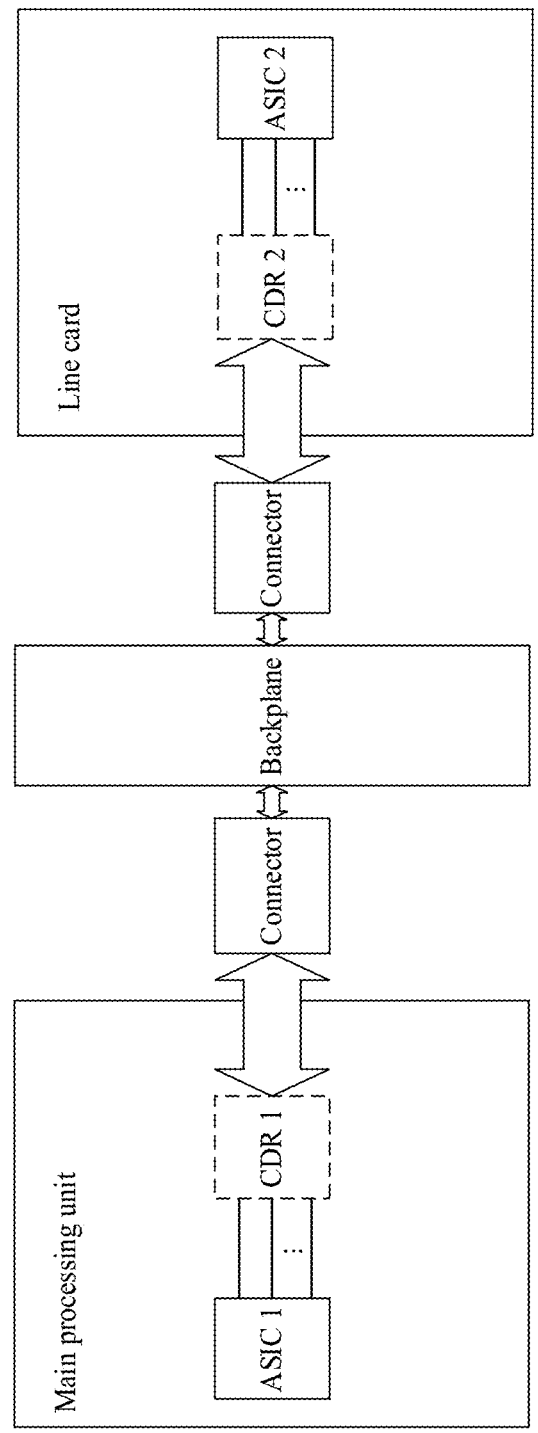
FIG. 3 is a schematic diagram of a structure of a network device according to an embodiment of this application.

As shown in FIG. 2, the network device includes a line card, a main processing unit (MPU), and a backplane. The line card and the MPU are interconnected by using the backplane. As shown in FIG. 3, the line card and the MPU may be interconnected with the backplane through a connector. The line card is also referred to as a line board (LPU), is configured to forward a packet, and may be classified into 10 gigabit (G), 20 G, 40 G, 50 G, 100 G, 120 G, 240 G, or the like according to its forwarding capability. The MPU is responsible for centralized control and management of network devices. For example, the MPU performs functions such as route calculation, device management and maintenance, data configuration, and data saving. The network device may further include a physical interface card (PIC). The PIC may be inserted into an interface board of the line card, and is responsible for converting an opto-electronic signal into a data frame and performing a "validity" check on the data frame. In some embodiments, the network device further includes a switching board (switch fabric). The switching board is also referred to as a switch fabric unit (SFU), and is responsible for data interchange between LPUs. The switching board may be interconnected with the main processing unit and the line card by using the backplane.

The backplane includes a plurality of lanes. A quantity of lanes on each backplane varies with different rates and specifications. However, the quantity of lanes on the backplane cannot be changed, and each lane on the backplane can be used to transmit data. For any circuit board, there is a specific upper limit for a data transmission rate supported by a lane on the circuit board. Therefore, when the network device needs to be upgraded, the backplane on the existing network device cannot be compatible with a rate of a new serializer/deserializer (SerDes) in a processor across generations. The processor may be a network processor (NP) or a central processing unit (CPU). The processor is used for an interface chip or a switching chip. During specific implementation, the interface chip or the switching chip may be an application-specific integrated circuit (ASIC) or a CDR, and the SerDes may be a circuit in the ASIC or the CDR. Actually, an upper limit of a backplane capacity=a quantity of lanes×a maximum data transmission rate of a single lane.

Using a current 400 gigabit Ethernet (GbE) port rate as an example, a SerDes rate specified according to the Institute of Electrical and Electronics Engineers (IEEE) 802.3 standard on each physical lane of an electrical interface may be:

26.5625 gigabit per second (Gbps) (16-lane 400GAUI-16),
53.125 Gbps (8-lane 400GAUI-8), and
106.25 Gbps (4-lane 400GAUI-4, standards being developed).

In addition to the foregoing rates, usually, the SerDes can also support other baud rates that are integer multiples of 156.25 megahertz (MHz), for example, 112.5 Gbps 4-level pulse amplitude modulation (PAM4) (56.25 gigabaud (GBd)).

Currently, there is no standard for a next-generation Ethernet interface rate. The following assumes that 8× electrical interfaces are used as an example for discussion for 800 GbE, but this is not limited to this rate. To achieve a smooth upgrade, the key lies in that the current backplane needs to support the next-generation Ethernet rate and a capacity of an entire system needs to be increased by increasing the port rate on the line card. As shown in FIG. 3, the backplane is connected to the line card by using the connector. If an 8×100 G rate needs to be achieved by using the backplane and the connector in the 8×50 G era, performance indicators of a printed circuit board (PCB) and the connector cannot meet expectations. If the backplane continues to use a 50 G single-lane technology, an overall capacity is the same as a current capacity and is not increased, and a future standard may not support a 50 G single-lane rate standard. Therefore, other single-lane rates need to be considered. However, a frequency designed for the SerDes is often limited and can be used only in a specific range. Therefore, it is necessary to confirm whether the rate can be supported by the SerDes. If there is a range (frequency hole) that is not supported by a SerDes frequency, the range needs to be avoided. After the single-lane rate is increased, compared with indicators that exist during backplane design, an insertion loss caused by backplane cabling and the connector increases, and a crosstalk between signals also increases, severely reducing an SNR. To avoid the frequency hole, a link speed needs to be increased, which also brings some available overheads. Therefore, the overheads may be used to compensate for an SNR loss by adding an additional FEC.

In a SerDes design, a phase-locked loop (PLL) is a core circuit that determines the SerDes operating frequency. A frequency at which the PLL operates is usually not continuously adjustable, but is a multiple of a specific base frequency. Although a flexible PLL design can support fractional frequency multiplication operation in addition to integral frequency multiplication operation, a frequency at which the PLL can operate is not continuously adjustable. In principle, the SerDes cannot support all frequencies. Instead, the SerDes can only support some fixed frequencies. A frequency range that the PLL does not support is referred to as a "frequency hole".

In addition, the SerDes design is often optimized for required operating frequencies. The SerDes design may not support a non-operating frequency or have poor performance on a non-operating frequency. For example, 53.125 Gbps and 106.25 Gbps are common SerDes rates, but there may be uncommon rates near 80 Gbps. Therefore, a frequency band near 80 Gbps is avoided to simplify the design, and the frequency hole becomes larger. For example, a specific SerDes may choose not to support rates ranging from 75 Gbps to 85 Gbps to simplify the design and reduce costs.

In the embodiments of this application, the following three manners of high link rates are provided:

(a) An FEC with appropriate overheads is selected based on overhead space that can be brought by a target rate.
(b) Additional data is inserted at a time or in segments by using an AM character as a boundary, where a data format is not limited.
(c) Additional data is inserted by using a MAC layer, where the additional data may be a special and identifiable code block.

The embodiments of this application also provide a method for extending a quantity of PCS lanes to adapt to a non-standard rate physical interface.

FIG. 2 shows a network device according to an embodiment of this application. A backplane is connected to a main processing unit and a line card. The main processing unit includes an ASIC 1, and the line board includes an ASIC 2. In some embodiments, the main processing unit further includes a CDR circuit CDR 1 that communicates with the ASIC 1. In some embodiments, the line card further includes a CDR 2 that communicates with the ASIC 2. In some embodiments, the CDR circuit may appear on the main processing unit or the line card, but the CDR circuit may not be required when an ASIC capability is sufficient. The embodiments of this application are related to some or all of the ASCI 1, the CDR 1, the CDR 2, and the ASIC 2. The ASIC 1 in the main processing unit can communicate with the backplane, and the ASIC 2 in the line card can communicate with the backplane. As shown in FIG. 3, the main processing unit and the line card may be separately connected to the backplane by using a connector, to communicate with the backplane.

Figure 4A:
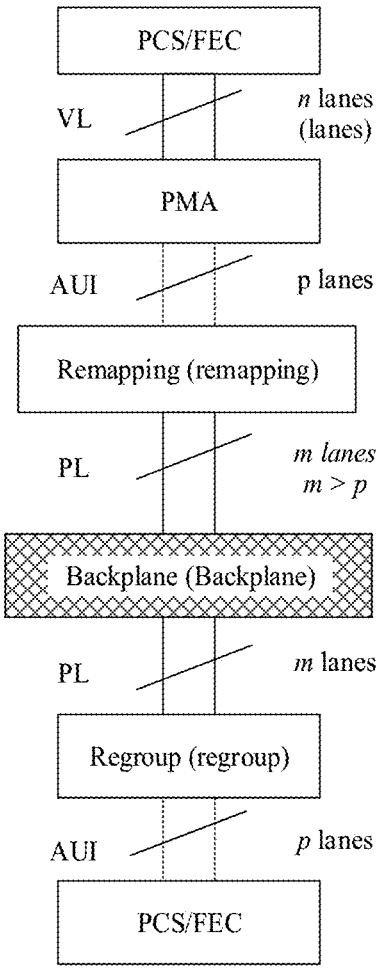
FIG. 4A is a schematic diagram of a logical architecture of an Ethernet interface according to an embodiment of this application.

FIG. 4A shows a logical layer architecture corresponding to an Ethernet interface on the network device in FIG. 1, FIG. 2, or FIG. 3. FIG. 4A may slightly vary with different implementation locations in a system according to the embodiments of this application. Physical coding and forward error collection are functions of a PCS and an FEC sublayer defined in the IEEE 802.3 standard, respectively. The function is usually integrated into the ASIC. A function of the physical coding sublayer (PCS) is to perform encoding, transcoding, scrambling, AM insertion, FEC encoding, and the link on data from a MAC layer, and distribute processed data to a plurality of VLs or physical lanes (PLs) according to a specific rule. The rule of distributing the processed data to the plurality of VLs or PLs is not limited in this application. For example, the rule may be determined based on a scenario or a data coding requirement. For example, a 200 GE/400 GE Ethernet interface is used as an example. Any two consecutive FEC symbols are from different codewords, that is, two consecutive FEC symbols of one codeword are distributed to different VLs or PLs. For a 100 GE Ethernet interface, FEC symbols are cyclically sent (round-robin) to each VL or PL.

As shown in FIG. 4A, the processed data is transmitted to a physical medium attachment sublayer (PMA) by using n VLs, and the PMA transmits data transmitted on the plurality of VLs to p lanes. For example, before PMA transmission, bit multiplexing (bit-mux) may be further performed. For example, data processed by the PCS/FEC is distributed to the p lanes on an attachment unit interface (AUI), and the p lanes may be VLs. After performing a remapping operation on the data on the p lanes, the data is mapped to m physical lanes PLs on the backplane, where m and p are positive integers, and m>p>0. After being processed by the backplane, the data leaves the backplane by using the m physical lanes. After being regrouped, the data arrives at another PCS/FEC by using the p lanes, where the p lanes may be VLs. For example, the other PCS/FEC may support different quantities of VLs. This is not limited in the embodiments of this application.

Using an existing 400 GbE standard as an example, data processed by the PCS are distributed to 16 VLs, and an equivalent bit rate of each VL is 26.5625 Gbps. A quantity of physical lanes (PLs) is determined by a specific application. For example, when the backplane is designed by using a single-lane 50 G PAM4 technology (or 56 G PAM4 in the industry, where an actual rate is 53.125 Gbps), the quantity of PLs is 8. Assuming that a total quantity of lanes during backplane design herein is M, a design capacity of the backplane is 50 G×M. If a device needs to be upgraded, a board that supports a higher electrical interface rate is replaced, for example, a board that supports a single-lane 100 G PAM4 technology (or 112 G PAM4 in the industry, where an actual rate is 106.25 Gbps), and the capacity of the entire system is increased by increasing a rate of each lane. However, performance of cabling on the PCB or the connector between the board and the backplane is limited by many aspects, including materials, designs, and the like, and it is difficult to cope with a new higher rate requirement. Therefore, an appropriate electrical interface transmission rate B2 that is higher than an original electrical interface rate B0 and lower than a new electrical interface rate B1 needs to be found. B0<B2<B1.

It is assumed that a quantity of physical lanes corresponding to an Ethernet interface corresponding to a specific rate standard is N1 at the new electrical interface rate. An Ethernet interface rate is equal to N1×B1 (for example, for a 400 GbE interface, if B1=100 Gbps, N1=4). If a quantity of electrical interface lanes corresponding to B2 is N2, B2×N2=B1×N1. Because B2<B1, N2>N1.

In an existing Ethernet standard, a quantity of physical lanes p that can be supported by a specific Ethernet interface rate depends on a quantity of virtual lanes N. For example, for 16 virtual lanes, a quantity of physical lanes such as 16, 8, or 4 may be correspondingly generated, which may be implemented by simple bit multiplexing. If an electrical interface rate is doubled, a quantity of corresponding physical lanes may be reduced to ½ of the original rate. However, if the electrical interface rate is not increased by an integer multiple, the quantity N of virtual lanes needs to be adjusted to support a quantity P2 of physical lanes at the rate B2. Still using 400 GbE as an example, 5×80 G (B2=80 G, and N2=5) may exist in a range from 8×50 G to 4×100 G. For future 800 GbE, 8×100 G may exist. If the backplane cannot support a 100 G electrical interface, there may be rates such as 10×80 G or 12×66.67 G. Even, a total data rate of N1×B1 can be used for transmission by using N2 electrical interfaces whose rates are lower than a standard rate, provided that N2×B2≥N1×B1 can be ensured.

In the foregoing embodiment, 10×80 G is used as an example for 800 GbE. If the SerDes does not support the electrical interface rate, it is difficult to use this configuration. To avoid this hole, a data transmission rate can be increased on the electrical interface. If the electrical interface rate is reduced, more physical lanes on the backplane are required, and a quantity of physical lanes on the backplane is limited. To fully utilize the lanes on the backplane, N2 is usually a maximum utilization value calculated based on a transmission capability of the backplane. If the electrical interface rate is reduced, a value of N2 needs to be increased, so that a total quantity of Ethernet interfaces that can be supported by the backplane is reduced. A bit rate for data transmission on the electrical interface needs to be increased, but a quantity of payloads is fixed. Therefore, additional data needs to be inserted into an original data stream. Increasing the data transmission rate on the electrical interface means that an insertion loss of the lane on the backplane is greater, and a crosstalk between signals is greater. As a result, performance of the link is reduced, and even a bit error rate on the link is excessively high, causing other problems.

Figure 4B:
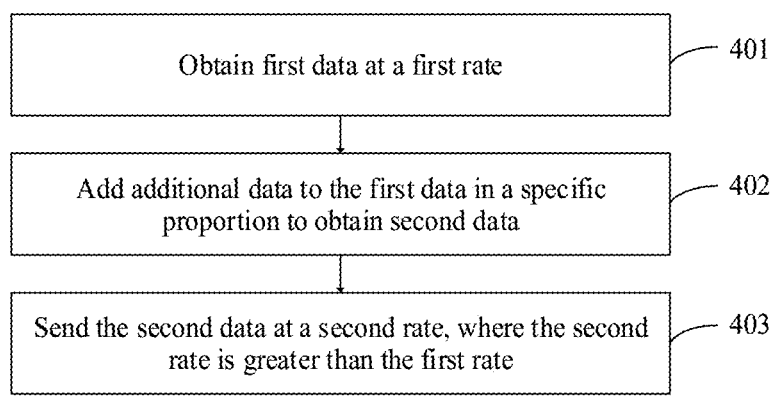
FIG. 4B is a flowchart of a method for adjusting a transmission rate according to an embodiment of this application.

In view of this, the embodiments of this application provide a method for adjusting a transmission rate. In the method, a transmission rate is increased by adding additional data to first data in a specific proportion, to break a limitation of a backplane on device capacity expansion and upgrade during device capacity expansion and upgrade. This can not only avoid a frequency hole, but also can meet a future performance requirement. As shown in FIG. 4B, the method includes the following steps.

401. Obtain a First Data at a First Rate.

The first data may be FEC-encoded data, or may be original data. A type of the first data is not limited in this embodiment of this application.

For example, using the network device shown in FIG. 2 as an example, in the logical layer architecture corresponding to the Ethernet interface on the network device, the PCS/FEC performs processing such as encoding, transcoding, scrambling, AM insertion, and FEC encoding on the data from the MAC layer to obtain the first data. Then, the processed data, that is, the first data, is distributed to the plurality of VLs or PLs according to the specific rule. In this case, a rate at which the first data is transmitted may be the first rate. In this embodiment of this application, the first data may be obtained from the plurality of VLs or PLs on which the first data is subsequently transmitted by the PCS/FEC. Alternatively, data on which VL remapping is performed and that does not enter a physical link may be used as the first data obtained at the first rate. One physical link may have a plurality of physical lanes. For example, the first data may be further obtained from the physical link, or the original data may be obtained before the ASIC performs FEC encoding, and the original data is used as the first data. Alternatively, the first data may be obtained from the CDR that communicates with the ASIC.

402. Add Additional Data to the First Data in a Specific Proportion to Obtain Second Data.

For example, when the additional data is added to the first data in the specific proportion, the additional data may be located in a first part of the second data. In this manner, the additional data may be added to the first data as a whole. A specific location of the first part of the second data is not limited in this embodiment, and may be determined based on content of the first data, or may be determined based on a scenario. For example, the first part of the second data may be located before or after an AM character.

Alternatively, a first part of the additional data is located in a first part of the second data, a second part of the additional data is located in a second part of the second data, and a part of the first data is included between the first part of the additional data and the second part of the additional data. In this manner, the additional data is segmented and added to the first data. For example, the first data may be divided into a plurality of parts, and different parts of the additional data are added to different parts of the first data.

Regardless of an insertion manner, according to the method provided in this embodiment of this application, the additional data may be inserted at a plurality of locations. This manner is flexible. Next, the following three manners of adding the additional data are used as an example for description.

Manner 1: In an embodiment of this application, an example in which the additional data is added through FEC by using additional overheads brought by increasing the rate.

Figure 5A:
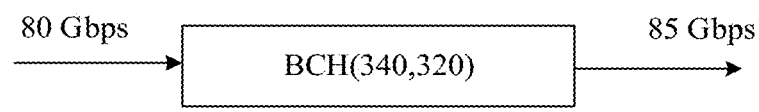
FIG. 5A and FIG. 5B are two schematic coding diagrams according to embodiments of this application.
Figure 5B:
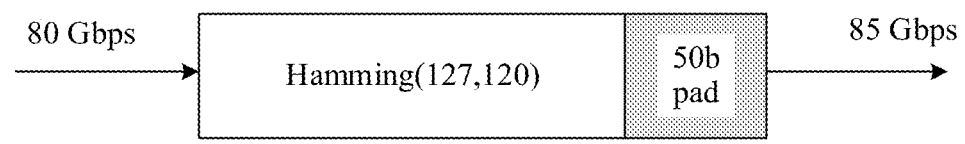
Figure 5C:
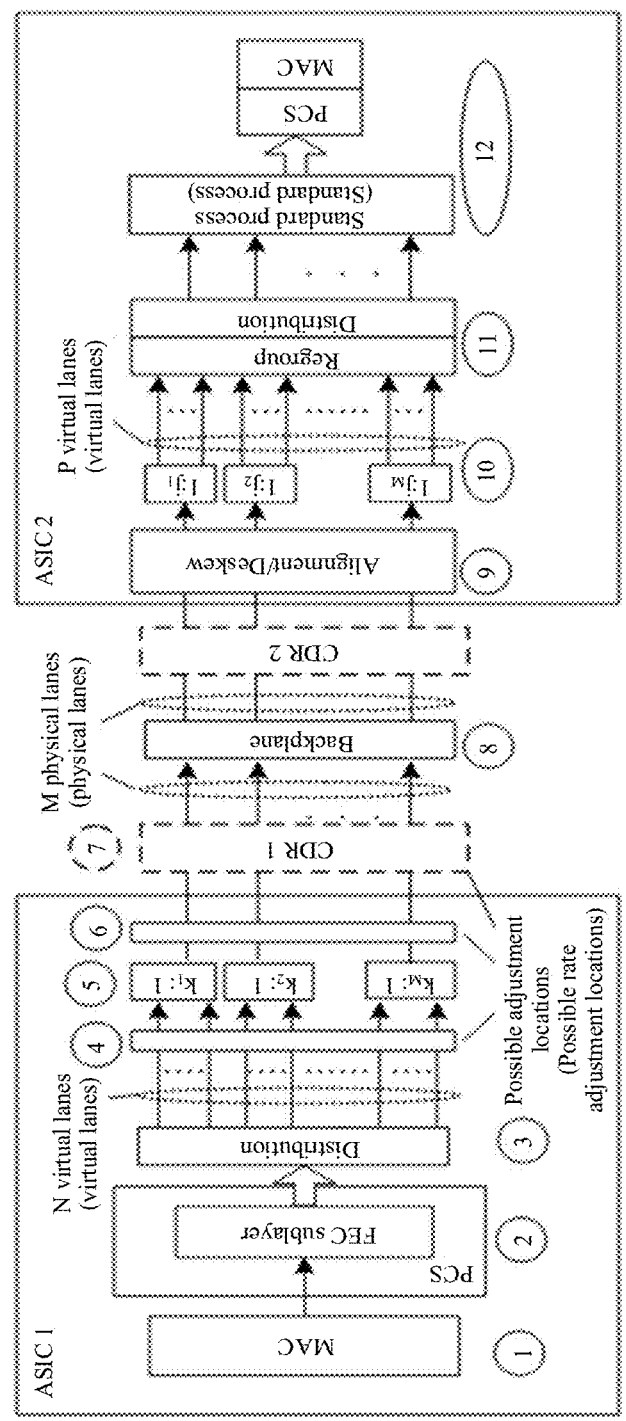
FIG. 5C is a schematic diagram of a method for adjusting a data transmission rate according to an embodiment of this application.

In Manner 1, the first data may be encoded based on a second rate by using an FEC code, to obtain the second data. As shown in FIG. 5C, the ASIC 1 communicates with the ASIC 2 by using the backplane. The ASIC 1 includes a MAC, a PCS, and a distribution module. The ASIC 1 may further include circuits at some adjustment locations. The CDR 1 may be further included between the ASIC 1 and the backplane. The ASIC 2 includes an alignment/deskew circuit, a regroup circuit, a distribution circuit, a PCS, and a MAC. For example, rate adjustment may be further performed at locations of an alignment/deskew circuit 9, a demultiplexing circuit 10, and a regroup and distribution circuit 11. The CDR 2 may be further included between the ASIC 2 and the backplane. After being processed by the MAC layer of the ASIC 1, the data arrives at the PCS of the ASIC 1, where the PCS includes an FEC sublayer. After being processed by the FEC sublayer, the data arrives at the distribution circuit and is distributed to N VLs. The data from the N VLs arrives at the backplane after a plurality of operations at possible adjustment locations, such as operations of 4, 5, and 6 shown in FIG. 5C. 4 is an encoding functional circuit, 5 is a bit multiplexing circuit, and 6 is an encoding functional circuit. Certainly, the data from the N VLs may also arrive at the backplane after being processed by the CDR 1 of 7. The data arrives at the alignment/deskew circuit (namely, 9) of the ASIC 2 after being processed by the backplane. The data arrives at 10 and the regroup circuit and the distribution circuit of 11 after being processed by the alignment/deskew circuit. The data arrives at a standard processing circuit of 12 after being processed, and the data arrives at the PCS and the MAC layer of the ASIC 2 after being processed.

For example, the first rate at which the first data is transmitted on a single physical lane is 80 Gbps and the second rate at which the second data is transmitted on the single physical lane is 85 Gbps. A rate ratio of the second rate to the first rate is 85/80=17/16. In this case, a ratio of the additional data to the first data is 1/16, and a ratio of the additional data to the second data is 1/17. A ratio of coded data to bit data of an FEC code matching the rate ratio is the rate ratio. For example, when the rate ratio is 17/16, the FEC code matching the rate ratio is an FEC code in which a ratio of coded data to bit data is 17/16, for example, Reed-Solomon (RS)(34,32) or Bose-Chaudhuri-Hocquenghem (BCH)(340,320), as shown in FIG. 5A. BCH(340,320) is one of BCH forward error correction codes. Alternatively, as shown in FIG. 5B, if there is a proportion difference between FEC overheads and rate increase overheads, an FEC and padding are used for increasing a rate, for example, Hamming(127,120) is used, and 50-bit padding data is inserted after every 100 hamming code blocks. The 50-bit padding data is used as the additional data. As shown in FIG. 5C, this solution may be implemented in a plurality of places. For example, the first data is encoded based on the second rate by using the FEC code, to obtain the second data. This solution includes but is not limited to the following several manners:

A. The Solution is Implemented on a VL Distributed by an FEC Sublayer (Shown by the Icon 4).

In Manner A, the FEC sublayer distributes data to a plurality of VLs, and then the data of the VL may be directly sent to one or more level-2 FEC encoders, and a quantity of VLs remains unchanged after encoding.

For example, when the first data is data transmitted on the VL distributed by the FEC sublayer and encoded by using a first FEC code, on the VL distributed by the FEC sublayer, secondary encoding is performed, by using a second FEC code matching the rate ratio, on the data that is transmitted on the VL distributed by the FEC sublayer and that is encoded by using the first FEC code, to obtain the second data. The rate ratio is a ratio of the second rate to the first rate.

B. The Solution is Implemented after VL Remapping is Performed and Before a Physical Link is Entered (Shown by the Icon 6).

In Manner B, for a VL, a corresponding quantity of physical lanes have been generated through bit multiplexing. In this case, level-2 FEC encoding may be performed on data streams on different physical lanes in the ASIC.

For example, the first data is data on which VL remapping is performed, that does not enter the physical link, and that is encoded by using a first FEC code, secondary encoding is performed, by using a second FEC code matching the rate ratio, on the data on which VL remapping is performed, that does not enter the physical link, and that is encoded by using the first FEC code, to obtain the second data.

C. The Solution is Implemented by Obtaining a Data Stream on a Physical Link and then Encoding the Data Stream (Shown by the Icon 7).

In Manner C, when data on the physical link passes through the CDR 1, level-2 FEC encoding is performed.

For example, when the first data is data transmitted on the physical link and encoded by using a first FEC code, secondary encoding is performed, by using a second FEC code matching a rate ratio, on the data transmitted on the physical link and encoded by using the first FEC code, to obtain the second data.

D. The ASIC Directly Uses a Single-Level or Multi-Level FEC with Higher Overheads for Encoding (Shown by the Icon 2).

In Manner D, the ASIC directly performs encoding based on a new FEC with a higher gain.

For example, the first data is original data, and the original data is encoded by using a third FEC code matching the second rate, to obtain the second data. Overheads of the third FEC code are greater than overheads of a first FEC code.

E. An Original FEC is Terminated in the CDR 1, and a Single-Level or Multi-Level FEC With Higher Overheads is Used for Encoding (Shown by the Icon 7).

In Manner E, the CDR 1 performs regrouping, decoding, and error correction on data on a link, then performs new FEC encoding.

For example, the first data is data encoded by using a first FEC code, the data encoded by using the first FEC code is decoded to obtain original data, and the original data is encoded by using a third FEC code matching the second rate, to obtain the second data. Overheads of the third FEC code are greater than overheads of the first FEC code.

In the foregoing Manner D and Manner E, regardless of the third FEC code or the first FEC code, overheads of an FEC code are a data difference, and the data difference is a difference between the coded data and the original data. The coded data is data obtained by encoding the original data by using the FEC code. For example, if the coded data obtained by encoding the original data by using the first FEC code is coded data 1, overheads of the first FEC code are a difference between the coded data 1 and the original data. For example, if the coded data obtained by encoding the original data by using the third FEC code is coded data 3, overheads of the third FEC code are a difference between the coded data 3 and the original data. A new FEC, that is, the third FEC code, may be a code of a same type as the first FEC code FEC 1 but with higher overheads (for example, the FEC 1 uses RS(544,514), and the new FEC uses a Reed-Solomon forward error correction code (RS-FEC), for example, RS(576,514)), or the new FEC is an FEC of a completely different type from the first FEC code, but has a higher error correction capability.

Manner 2: In another embodiment of this application, an example in which the additional data is inserted at a MAC layer is used. This method is applicable to a scenario where a link status is relatively healthy and an SNR still meets a requirement after a rate is increased. For example, when the first data is data at the MAC layer, first additional data is inserted, in a first proportion, into the data at the MAC layer, to obtain the second data. The first proportion may be determined based on data volumes of the second data and the first data. This is not limited in this embodiment of this application.

Figure 7:
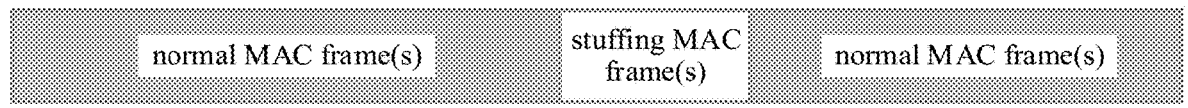
FIG. 7 is a schematic diagram of a scenario in which a stuffing MAC frame(s) is added to a MAC layer according to an embodiment of this application.

As shown in FIG. 7, a frame (stuffing MAC frame(s)) may be stuffed between normal MAC frames (normal MAC frame(s)). The frame used for stuffing may be an idle frame, or may be another specially defined data frame that can be identified and discarded at a peer MAC layer. The stuffing MAC frame herein is similar to the foregoing additional padding data. In this manner, the MAC may identify original data at a receive end, and may search for the additional padding data by using a code block in the original data or a character in a packet.

Manner 3: In another embodiment of this application, if the first data includes an AM character, the additional data is inserted into the first data in the specific proportion by using the AM in the first data as a boundary.

For example, the AM character is used as a reference, and the additional data is inserted into the data at a time or in segments, to increase a data transmission rate. Because an SNR can be improved through FEC encoding, when a link status is relatively healthy and the SNR still meets a requirement after a rate is increased, the SNR may not need to be improved through the FEC encoding, and the data transmission rate may be increased by inserting invalid data. Certainly, after the link status is relatively healthy and the rate is increased, even if the SNR still meets the requirement, the FEC encoding may still be used, that is, the inserted additional data may be an FEC code. A type of the additional data to be inserted is not limited in this embodiment of this application. However, because original data herein is a data stream processed by a PCS and having no packet format, a receive end needs to identify and delete the inserted additional data, to recover the original data according to a processing procedure of the PCS. Because the AM character provides an existing mark for data identification, some additional data may be inserted by using the AM character as a reference point, thereby facilitating subsequent identification of the inserted data. The data may be inserted at 4 in FIG. 5C with the AM characters on a VL, or may be inserted at 6 in FIG. 5C after bit multiplexing. For example, when the first data is data transmitted on a VL distributed by an FEC sublayer at 4 in FIG. 5C, second additional data is inserted, in a second proportion by using the AM character as the boundary, into the data transmitted on the VL distributed by the FEC sublayer, to obtain the second data. For example, when the first data is data on which VL remapping is performed and that does not enter a physical link at 6 in FIG. 5C, third additional data is inserted, in a third proportion by using the AM character as the boundary, into the data on which VL remapping is performed and that does not enter the physical link, to obtain the second data. It should be noted that the second proportion and the third proportion may be determined based on a data volume of the first data and a data volume of the second data. This is not limited in this application.

Figure 6:
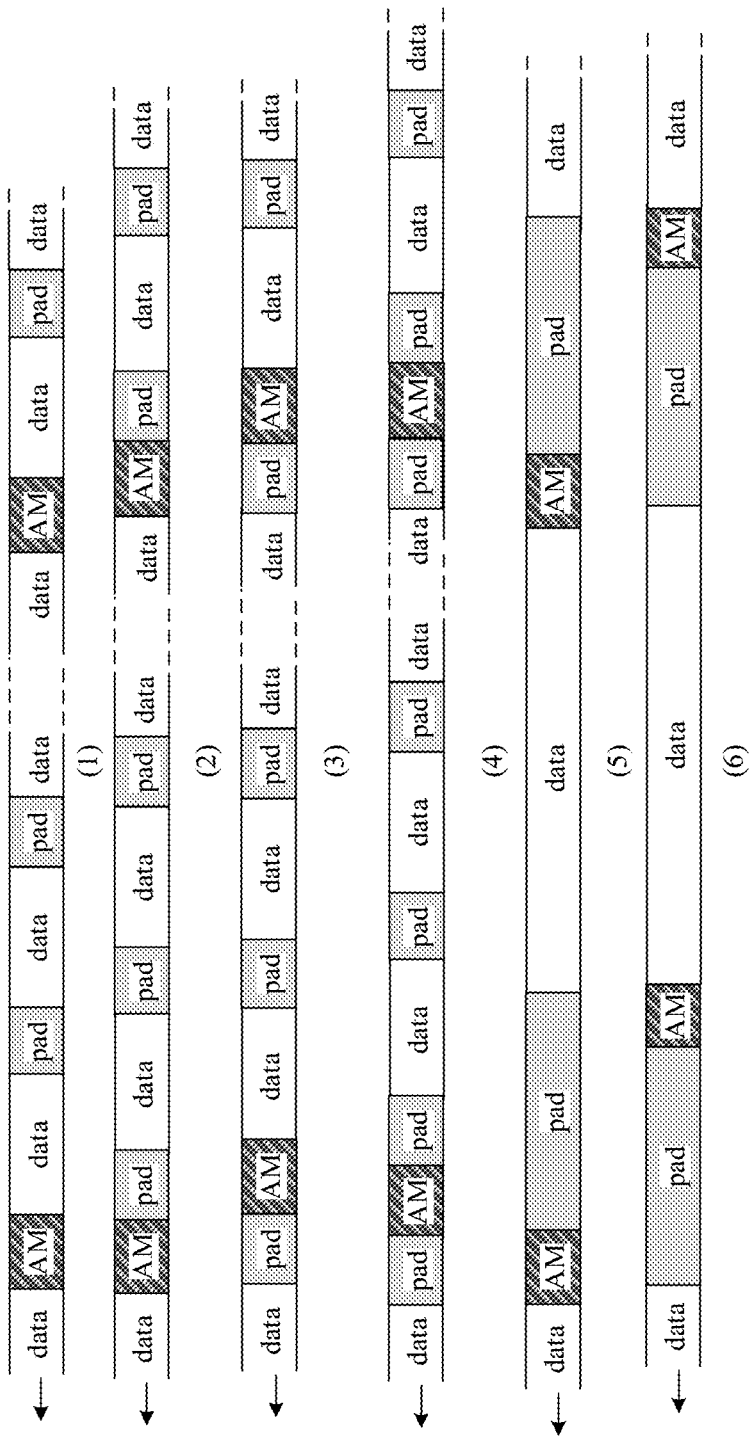
FIG. 6 is a schematic diagram of a plurality of scenarios in which additional padding data is inserted according to an embodiment of this application.

Regardless of a location at which the additional data is inserted, manners of inserting the additional data by using the AM character as the boundary include but are not limited to several manners shown in FIG. 6, and each insertion manner in FIG. 6 is as follows:

(1) Two AM characters are used as a boundary, data in the middle is equally divided, and padding data is inserted between the equally divided data.

(2) Two AM characters are used as a boundary, data in the middle is equally divided, and padding data is inserted before the equally divided data.

(3) Two AM characters are used as a boundary, data in the middle is equally divided, and padding data is inserted after the equally divided data.

(4) Two AM characters are used as a boundary, data in the middle is equally divided, and padding data is inserted before and after the equally divided data.

(5) Padding data is inserted after the AM character at a time.

(6) Padding data is inserted before the AM character at a time.

It is recommended that a PRBS31 sequence be used to select additional data (padding data) segment by segment to ensure randomness of the data and avoid spikes on a frequency spectrum. Different lengths of the additional padding data may be selected according to an implementation. There may also be a plurality of manners of inserting the additional padding data, for example, inserting the additional padding data before the AM character or inserting the additional padding data after the AM character, provided that it is ensured that a ratio of the inserted additional padding data to data (including the AM character) meets a requirement. During implementation, sufficient additional padding data may be inserted at a time instead of inserting the additional padding data in segments.

In addition to the foregoing three manners, there may be another manner of inserting data. For example, the additional data is inserted at 7 shown in FIG. 5C. For example, when the first data is data transmitted on the physical link at 7 in FIG. 5C, fourth additional data is inserted, in a fourth proportion, into the data transmitted on the physical link, to obtain the second data. For example, when the first data is original data, fifth additional data is inserted into the original data in a fifth proportion, to obtain the second data. The fourth proportion and the fifth proportion may be determined based on a data volume of the first data and a data volume of the second data. This is not limited in this application.

403. Send the Second Data at a Second Rate, where the Second Rate is Greater than the First Rate.

For example, the second rate may be an integer multiple of the first rate, or the second rate may not be an integer multiple of the first rate. When the second rate is not an integer multiple of the first rate, if a rate of a virtual lane is relatively high after the rate is increased, even if multiplexing is performed according to a minimum rate in the virtual lane, a rate allowed by a physical lane is exceeded. In the method provided in this embodiment of this application, the virtual lane is extended, and the second rate of the physical lane is determined through bit multiplexing. When the second rate is not an integer multiple of the first rate, another embodiment of this application provides a method for extending a VL.

A quantity of N1 (that is, a quantity of virtual lanes for transmitting the first data) existing standard VLs may be exactly divided by P1, where P1 is a quantity of physical lanes defined in a standard. N2 is a quantity of non-standard VLs that need to be extended (that is, a quantity of extended virtual lanes), and may be exactly divided by P2, where P2 indicates a quantity of physical lanes corresponding to a single Ethernet port when a B1 rate cannot be supported by the backplane and a B2 rate is used for data transmission (that is, a quantity of corresponding physical lanes when data is transmitted at the second rate by using a data transmission interface).

In an embodiment of this application, N2 is set to be equal to a least common multiple of N1 and P2. In this way, N2 may be exactly divided by P2, and for N2, simple multiplexing may be performed on the N1 VLs.

For example, if N1=8 and P2=12, N2 may be set to 24. In this way, 12 PLs can be generated for 24 VLs through simple bit multiplexing at a ratio of 2:1. In addition, because N2=3*N1, when data is distributed at the FEC, a round-robin period is changed from 8 to 24. To successfully identify these VLs at the receive end, an existing AM pattern may also be simply reused.

Figure 8A:
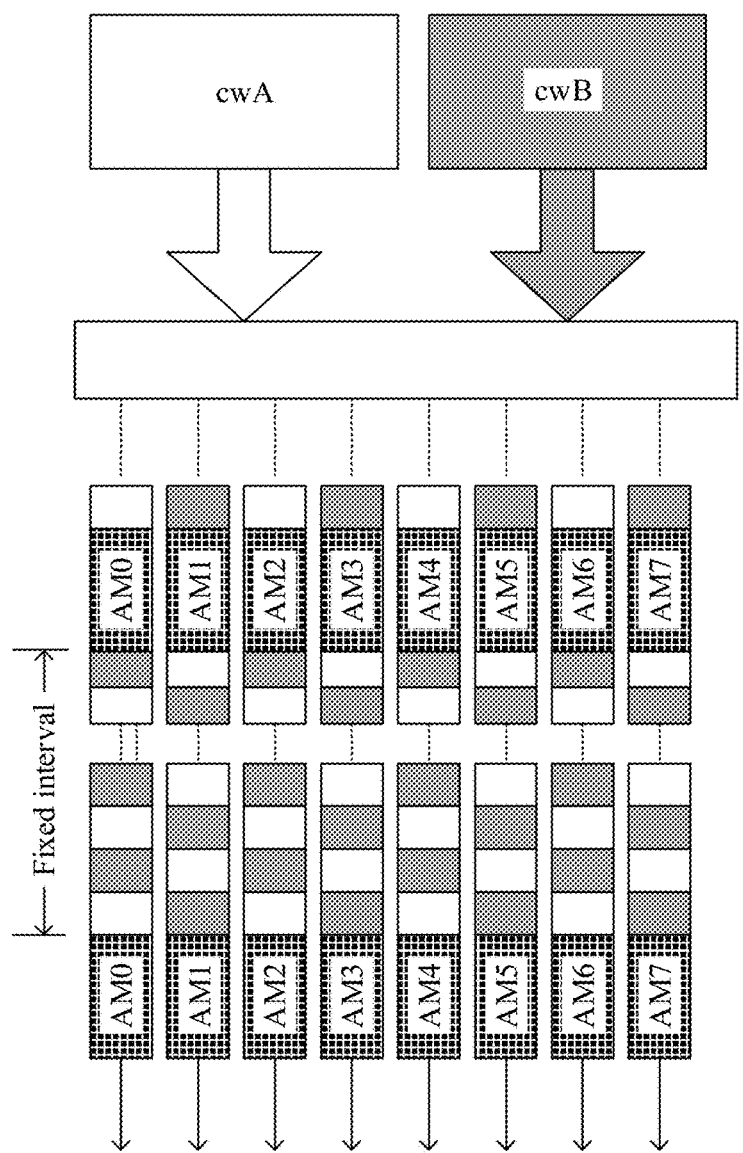
FIG. 8A is a schematic diagram of a method for extending VLs by reusing eight VLs corresponding to AM0 to AM7 according to an embodiment of this application.
Figure 8B:
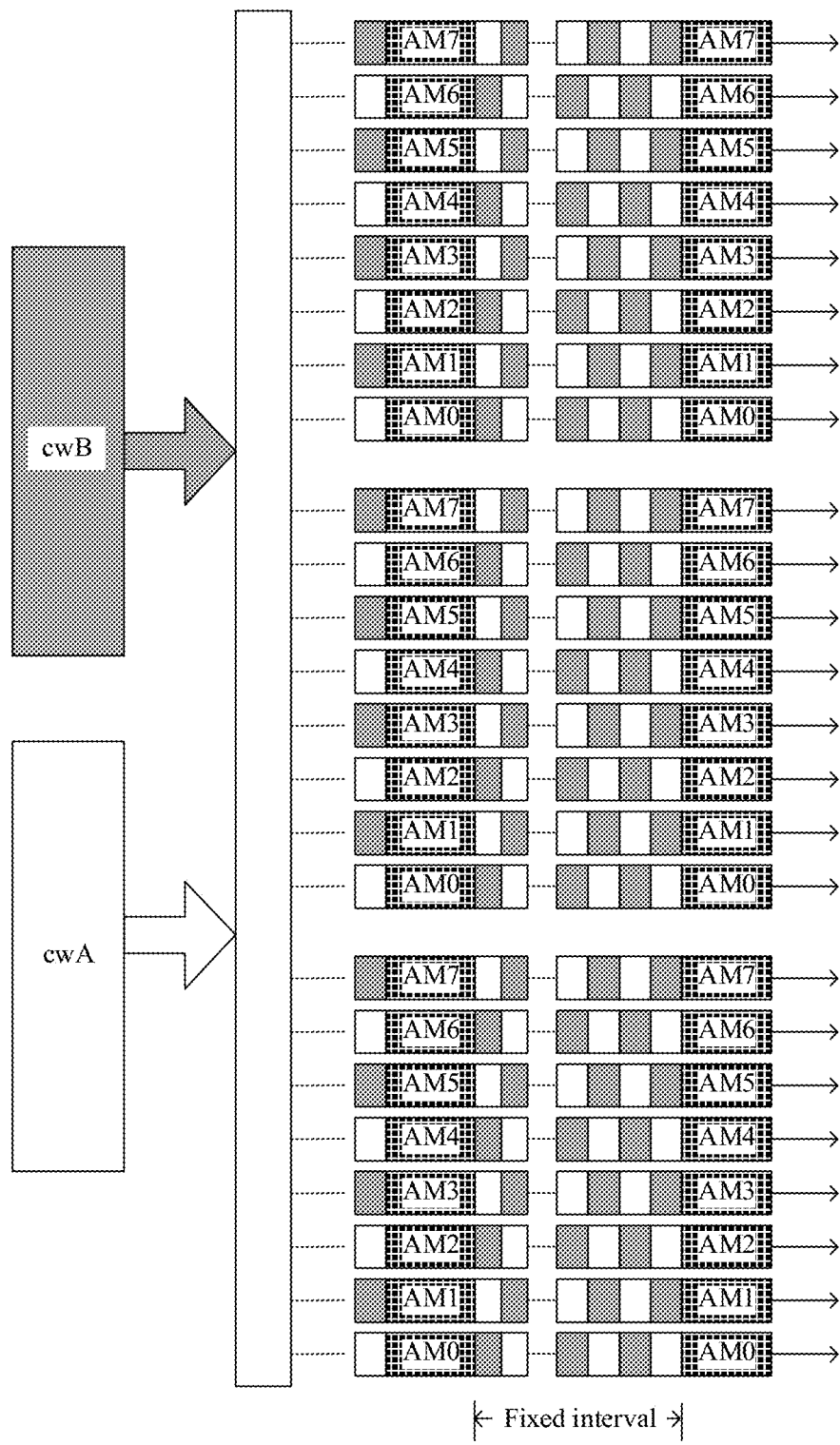
FIG. 8B is a schematic diagram of a method for extending VLs by reusing eight VLs for 24 VLs according to an embodiment of this application.

As shown in FIG. 8A, there are eight VLs corresponding to AM0 to AM7. As shown in FIG. 8B, 24 VLs are obtained through extension by repeating the eight VLs for three times. Because the backplane is connected and the backplane is implemented internally by a manufacturer, a specific PL and a corresponding interface may be determined. In addition, because a correspondence between a PL and a VL is known, a relationship between an interface and a VL can be obtained when the backplane is connected. Therefore, there is no need to search for an AM character again and use the AM to differentiate lanes. Certainly, different AM characters may be selected. AM0 to AM23 are different. Another method for extending VLs is provided herein.

When the virtual lane is extended, the sending second data at a second rate includes sending the second data at the second rate by using a physical lane. As described above, a rate at which data is transmitted by using the physical lane is determined by performing bit multiplexing based on the extended virtual lane. A quantity of extended virtual lanes is determined based on a quantity of virtual lanes for transmitting the first data and a quantity of corresponding physical lanes when data is transmitted at the second rate by using a data transmission interface.

For example, when the quantity of extended virtual lanes is determined based on the quantity of virtual lanes for transmitting the first data and the quantity of corresponding physical lanes when the data is transmitted at the second rate by using a data transmission interface, the quantity of extended virtual lanes may be determined based on a least common multiple of the quantity of virtual lanes for transmitting the first data and the quantity of corresponding physical lanes when the data is transmitted at the second rate by using a data transmission interface.

According to the method provided in this embodiment of this application, the transmission rate is increased by adding the additional data to the first data in the specific proportion, to break the limitation of the backplane on device capacity expansion and upgrade during device capacity expansion and upgrade. This can not only avoid the frequency hole, but also can meet the future performance requirement.

In addition, after the rate is increased, compared with indicators that exist during backplane design, an insertion loss caused by backplane cabling and the connector increases, and a crosstalk between signals also increases, severely reducing the SNR. To avoid the frequency hole, a link speed needs to be increased, which also brings some available overheads. Therefore, the overheads may be used to compensate for an SNR loss by adding an additional FEC.

Figure 9:
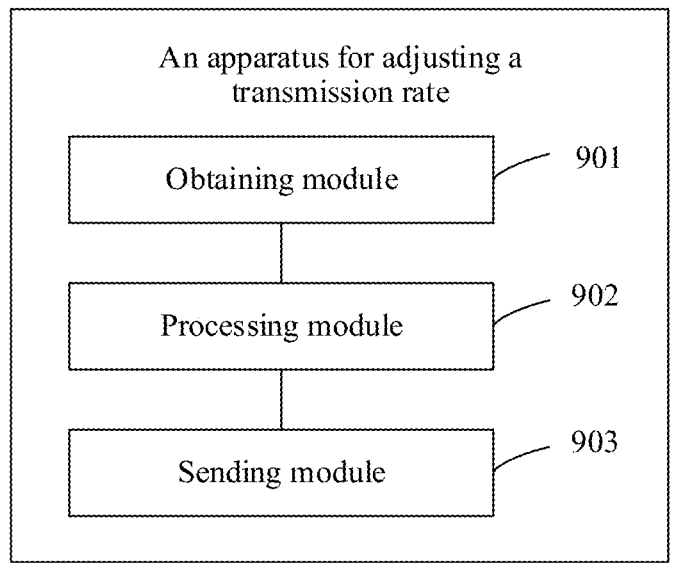
FIG. 9 is a schematic diagram of a structure of an apparatus for adjusting a transmission rate according to an embodiment of this application.

An embodiment of this application provides an apparatus for adjusting a transmission rate. Referring to FIG. 9, the apparatus includes an obtaining module 901 configured to obtain first data at a first rate, a processing module 902 configured to add additional data to the first data in a specific proportion to obtain second data, and the sending module 903 configured to send the second data at a second rate, where the second rate is greater than the first rate.

In an example embodiment, the second rate is not an integer multiple of the first rate.

In an example embodiment, the sending module 903 is configured to send the second data at the second rate by using a physical lane, where a rate at which data is transmitted by using the physical lane is determined by performing bit multiplexing based on an extended virtual lane. A quantity of extended virtual lanes is determined based on a quantity of virtual lanes for transmitting the first data and a quantity of corresponding physical lanes when data is transmitted at the second rate by using a data transmission interface.

In an example embodiment, the additional data is located in a first part of the second data.

In an example embodiment, a first part of the additional data is located in a first part of the second data, a second part of the additional data is located in a second part of the second data, and a part of the first data is included between the first part of the additional data and the second part of the additional data.

In an example embodiment, the first data includes an AM character, and the processing module is configured to insert the additional data into the first data in a specific proportion by using the AM character in the first data as a boundary.

In an example embodiment, the processing module 902 is configured to, when the first data is data at a MAC layer, insert in a first proportion, first additional data into the data at the MAC layer, to obtain the second data, when the first data is data transmitted on a VL distributed by an FEC sublayer, insert, in a second proportion, second additional data into the data transmitted on the VL distributed by the FEC sublayer, to obtain the second data, when the first data is data on which VL remapping is performed and that does not enter a physical link, insert, in a third proportion, third additional data into the data on which VL remapping is performed and that does not enter the physical link, to obtain the second data, when the first data is data transmitted on a physical link, insert, in a fourth proportion, fourth additional data into the data transmitted on the physical link, to obtain the second data, or when the first data is original data, insert, in a fifth proportion, fifth additional data into the original data, to obtain the second data.

In an example embodiment, the processing module 902 is configured to encode the first data by using an FEC code based on overheads of the second rate or overheads of the first rate, to obtain the second data.

In an example embodiment, the processing module 902 is configured to, when the first data is data that is transmitted on a VL distributed by an FEC sublayer and that is encoded by using a first FEC code, perform, by using a second FEC code matching a rate ratio, secondary encoding on the data that is transmitted on the VL distributed by the FEC sublayer and that is encoded by using the first FEC code, to obtain the second data, where the rate ratio is a ratio of the second rate to the first rate, when the first data is data on which VL remapping is performed, that does not enter a physical link, and that is encoded by using a first FEC code, perform, by using a second FEC code matching a rate ratio, secondary encoding on the data on which VL remapping is performed, that does not enter the physical link, and that is encoded by using the first FEC code, to obtain the second data, when the first data is data transmitted on a physical link and encoded by using a first FEC code, perform, by using a second FEC code matching a rate ratio, secondary encoding on the data transmitted on the physical link and encoded by using the first FEC code, to obtain the second data, when the first data is data encoded by using a first FEC code, decode the data encoded by using the first FEC code to obtain original data, and encode the original data by using a third FEC code matching the second rate, to obtain the second data, where overheads of the third FEC code are greater than overheads of the first FEC code, or when the first data is original data, encode the original data by using a third FEC code matching the second rate, to obtain the second data, where overheads of the third FEC code are greater than overheads of a first FEC code.

An embodiment of this application provides a processor. The processor may be configured to perform any one of the foregoing methods for adjusting a transmission rate.

An embodiment of this application provides a network device. As shown in FIG. 2 or FIG. 3, the network device includes the foregoing processor.

In an example embodiment, the network device includes a line card, and the line card includes the foregoing processor.

In an example embodiment, the network device further includes a backplane.

In an example embodiment, the network device further includes a CDR located between the line card and the backplane, and the line card communicates with the backplane by using the CDR.

An embodiment of this application provides a network system. The network system includes one or more network devices, and the network device is any one of the foregoing network devices.

Figure 10:
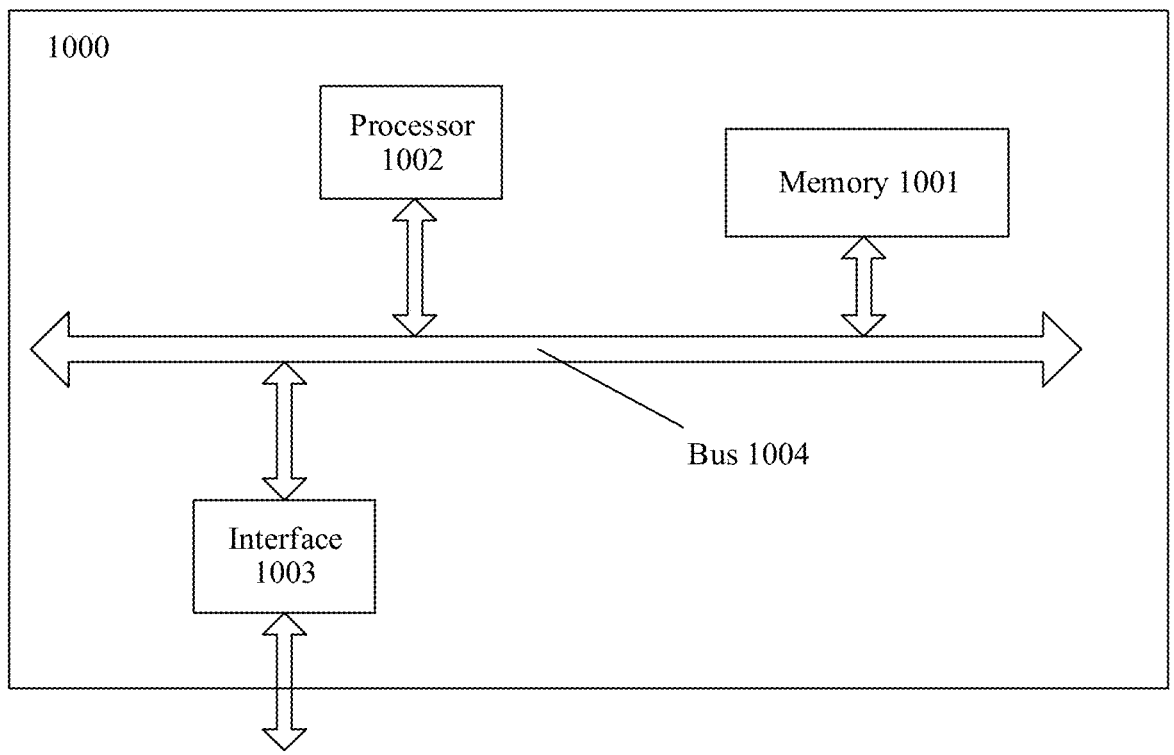
FIG. 10 is a schematic diagram of a structure of a device for adjusting a transmission rate according to an embodiment of this application.

As shown in FIG. 10, an embodiment of this application further provides a device 1000 for adjusting a transmission rate. The device 1000 for adjusting a transmission rate shown in FIG. 10 is configured to perform operations related to the foregoing method for adjusting a transmission rate. The device 1000 for adjusting a transmission rate includes a memory 1001, a processor 1002, and an interface 1003. The memory 1001, the processor 1002, and the interface 1003 are connected by using a bus 1004.

The memory 1001 stores at least one instruction, and the at least one instruction is loaded and executed by the processor 1002, to implement any one of the foregoing methods for adjusting a transmission rate.

The interface 1003 is used for communication with another device in a network. The interface 1003 may implement communication in a wireless or wired manner. For example, the interface 1003 may be a network adapter. For example, the device 1000 for adjusting a transmission rate may communicate with another network device by using the interface 1003.

It should be understood that FIG. 10 shows only a simplified design of the device 1000 for adjusting a transmission rate. During actual application, the device 1000 for adjusting a transmission rate may include any quantity of interfaces, processors, or memories. In addition, the processor may be a central processing unit (CPU), or may be another general-purpose processor, a digital signal processor (DSP), an ASIC, a field-programmable gate array (FPGA), or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (ARM) architecture.

Further, in an optional embodiment, the foregoing memory may include a read-only memory (ROM) and a random-access memory (RAM), and provide instructions and data to the processor. The memory may further include a nonvolatile RAM. For example, the memory may further store information about a device type.

The memory may be a volatile memory or a nonvolatile memory, or may include both a volatile memory and a nonvolatile memory. The nonvolatile memory may be a ROM, a programmable read-only memory (PROM), an erasable PROM (EPROM), an electrically EPROM (EEPROM), or a flash memory. The volatile memory may be a RAM that is used as an external cache. For example, but not limitation, many forms of RAMs are available, for example, a static RAM (SRAM), a dynamic RAM (DRAM), a synchronous DRAM (SDRAM), a double data rate (DDR) SDRAM, an enhanced synchronous DRAM (ESDRAM), a synchlink DRAM (SLDRAM), and a direct rambus (DR) RAM.

A computer-readable storage medium is further provided. The storage medium stores at least one instruction, and the instruction is loaded and executed by a processor, to implement any one of the foregoing methods for adjusting a transmission rate.

This application provides a computer program. When the computer program is executed by a computer, the processor or the computer may be enabled to perform corresponding operations and/or procedures in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, a solid-state disk SSD), or the like.

It can be learned from the foregoing descriptions of the implementations that, a person skilled in the art may clearly understand that all or some steps of the methods in the foregoing embodiments may be implemented by using a combination of software and a universal hardware platform. Based on such an understanding, technical solutions of the present application essentially or a part contributing to a conventional technology may be embodied in a form of a software product. The computer software product may be stored in a storage medium, for example, a ROM, a RAM, a magnetic disk, an optical disc, and the like, including instructions for enabling a computer device (may be a personal computer, a server, or a network communications device such as a media gateway) to perform the methods described in the embodiments or some parts of the embodiments of the present application.

It should be noted that the embodiments in this specification are all described in a progressive manner, for same or similar parts in the embodiments, refer to these embodiments, and each embodiment focuses on a difference from other embodiments. Especially, device and system embodiments are basically similar to the method embodiments, and therefore are described briefly. For related parts, refer to partial descriptions in the method embodiments. The described device and system embodiments are merely examples. The units described as separate parts may or may not be physically separate, and parts displayed as units may or may not be physical units, may be located at one position, or may be distributed on a plurality of network units. Some or all of the modules may be selected based on an actual requirement to achieve the objectives of the solutions of the embodiments. A person of ordinary skill in the art may understand and implement the embodiments without creative efforts.

The foregoing descriptions are merely optional implementations of this application, but are not intended to limit the protection scope of this application. It should be noted that a person of ordinary skill in the art may make some improvements and polishing without departing from the principle of this application and the improvements and polishing shall fall within the protection scope of this application.

EXPLANATION OF TERMS IN THIS APPLICATION

FEC: Forward error correction
RS-FEC: Reed-Solomon FEC
BCH: Bose-Chaudhuri-Hocquenghem
PCS: Physical coding sublayer
PMA: Physical medium attachment
PMD: Physical media dependent
PHY: Physical layer
AM: Alignment marker
VL: Virtual lane, which equivalent to a PCS lane
PL: Physical lane
SerDes: Serializer/deserializer
PLL: Phase-locked loop
CDR: Clock and data recovery
Gbps: Gigabit(s) per second
GBd: Gigabaud(s)
PAM: Pulse-amplitude modulation
PAM4: 4-level PAM or PAM-4
OSI: Open Systems Interconnection
PCB: Printed circuit board
One physical link may have a plurality of physical lanes.

What is claimed is:

1. A method, comprising:
obtaining first data at a first rate, wherein the first data is encoded using a first forward error correction (FEC) code type;
encoding the first data according to a second FEC code type, and adding additional data in a specific proportion to obtain second data, wherein the additional data is obtained by FEC encoding, and wherein the second FEC code type is different from the first FEC code type; and
sending the second data at a second rate, wherein the second rate is greater than the first rate.

2. The method of claim 1, wherein encoding the first data and adding the additional data comprise:
encoding the first data according to the second FEC code type to obtain encoded data; and
adding the additional data in the specific proportion to the encoded data to obtain the second data.

3. The method of claim 1, wherein encoding the first data comprises:
distributing the first data to multiple virtual lanes; and
encoding distributed data on the multiple virtual lanes according to the second FEC code type.

4. The method of claim 3, wherein adding the additional data comprises adding the additional data to the distributed data on the multiple virtual lanes.

5. The method of claim 3, wherein distributing the first data comprises distributing the first data to the multiple virtual lanes in a round-robin manner.

6. The method of claim 1, wherein the additional data comprises an identifier indicating to delete the additional data.

7. The method of claim 1, wherein the second rate is not an integer multiple of the first rate.

8. The method of claim 1, wherein a first part of the additional data is located in a first part of the second data, and a second part of the additional data is located in a second part of the second data, and wherein a part of the first data is included between the first part of the additional data and the second part of the additional data.

9. The method of claim 1, wherein the additional data comprises first additional data, second additional data, and third additional data, and wherein a length of a first portion of the second data comprised between first extra data and second extra data is equal to a length of a second portion of the second data comprised between the second extra data and third extra data.

10. The method of claim 1, wherein the additional data is encoded using the second FEC code type.

11. The method of claim 10, wherein the additional data is encoded without using the first FEC code type.

12. The method of claim 1, wherein the second FEC code type is Bose-Chaudhuri-Hocquenghem (BCH) or Hamming.

13. The method of claim 1, wherein before adding the additional data, the method further comprises performing FEC encoding on unencoded data to obtain the additional data.

14. The method of claim 1, wherein the additional data comprises a code block.

15. An apparatus, comprising:
an interface circuit configured to obtain first data at a first rate, wherein the first data is encoded using a first forward error correction (FEC) code type; and
a control circuit configured to encode the first data according to a second FEC code type, and add additional data in a specific proportion to obtain second data,
wherein the additional data is obtained by FEC encoding,
wherein the second FEC code type is different from the first FEC code type,
wherein the interface circuit is further configured to send the second data at a second rate, and
wherein the second rate is greater than the first rate.

16. The apparatus of claim 15, wherein the control circuit is further configured to:
encode the first data according to the second FEC code type to obtain encoded data; and
add the additional data in the specific proportion to the encoded data to obtain the second data.

17. The apparatus of claim 15, wherein the control circuit is further configured to:
distribute the first data to multiple virtual lanes; and
encode distributed data on the multiple virtual lanes according to the second FEC code type.

18. The apparatus of claim 17, wherein the control circuit is further configured to add the additional data to the distributed data on the multiple virtual lanes.

19. The apparatus of claim 17, wherein the control circuit is further configured to distribute the first data to the multiple virtual lanes in a round-robin manner.

20. The apparatus of claim 15, wherein the additional data comprises an identifier indicating to delete the additional data.

21. The apparatus of claim 15, wherein the second rate is not an integer multiple of the first rate.

22. The apparatus of claim 15, wherein a first part of the additional data is located in a first part of the second data, and a second part of the additional data is located in a second part of the second data, and wherein a part of the first data is included between the first part of the additional data and the second part of the additional data.

23. The apparatus of claim 15, wherein the additional data comprises first additional data, second additional data, and third additional data, and wherein a length of a first portion of the second data comprised between first extra data and second extra data is equal to a length of a second portion of the second data comprised between the second extra data and third extra data.

24. The apparatus of claim 15, wherein the apparatus further comprises a clock and data recovery (CDR) circuit.

25. The apparatus of claim 15, wherein the additional data is encoded using the second FEC code type.

26. The apparatus of claim 25, wherein the additional data is encoded without using the first FEC code type.

27. The apparatus of claim 15, wherein the second FEC code type is Bose-Chaudhuri-Hocquenghem (BCH) or Hamming.

28. A system, comprising:
a first apparatus comprising:
a first memory configured to store first instructions; and
one or more first processors coupled to the first memory and configured to execute the first instructions to cause the first apparatus to:
obtain first data at a first rate, wherein the first data is encoded using a first forward error correction (FEC) code type;
encode the first data according to a second FEC code type, and add additional data in a specific proportion to obtain second data, wherein the additional data is obtained by FEC encoding, FEC encoded data, and wherein the second FEC code type is different from the first FEC code type; and
send the second data at a second rate, wherein the second rate is greater than the first rate; and
a second apparatus comprising:
a second memory configured to store second instructions; and
one or more second processors coupled to the second memory and configured to execute the second instructions to cause the second apparatus to:
perform physical coding sublayer (PCS) processing on data from a medium access control (MAC) layer to obtain processed data; and
distribute the processed data to the first apparatus.

* * * * *